(12) United States Patent
Kussmaul et al.

(10) Patent No.: US 11,308,084 B2
(45) Date of Patent: Apr. 19, 2022

(54) OPTIMIZED SEARCH SERVICE

(71) Applicant: International Business Machines Corporation, Armonk, NY (US)

(72) Inventors: Timo Kussmaul, Boeblingen (DE);
Andreas Prokoph, Boeblingen (DE);
Uwe Hansmann, Tuebingen (DE);
Thomas Stober, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 16/352,177

(22) Filed: Mar. 13, 2019

(65) Prior Publication Data

US 2020/0293521 A1 Sep. 17, 2020

(51) Int. Cl.
*G06F 16/2453* (2019.01)

(52) U.S. Cl.
CPC ................ *G06F 16/2453* (2019.01)

(58) Field of Classification Search
CPC .................................. G06F 16/2453
USPC ........................................ 707/721
See application file for complete search history.

(56) References Cited

U.S. PATENT DOCUMENTS

| | | | |
|---|---|---|---|
| 8,914,379 B2 | 12/2014 | Zhu et al. | |
| 10,282,350 B1* | 5/2019 | Pathak | G06F 16/21 |
| 10,885,468 B2* | 1/2021 | Parkunan | G06F 16/3334 |
| 2010/0010977 A1 | 1/2010 | Choi et al. | |
| 2011/0270820 A1* | 11/2011 | Agarwal | G06F 16/31 707/E17.108 |
| 2017/0024657 A1* | 1/2017 | Sahu | G06F 16/951 |
| 2018/0181670 A1* | 6/2018 | Goel | G06F 16/951 |
| 2018/0268035 A1* | 9/2018 | Kalakanti | G06F 16/256 |
| 2020/0019633 A1* | 1/2020 | Kathirvel | G06N 20/00 |

OTHER PUBLICATIONS

Non-Patent Literature: Valentin Kuznetsov, Dave Evans, Simon Metson; "The CMS Data Aggregation System;" Elsevier Ltd., ScienceDirect, International Conference on computational Science, ICCS 2010, Procedia Computer Science 1 (2012) 1535-1543, 9 pages, http://dx_doi.rg/10.1016/j_procs.2010.04.172.*

(Continued)

*Primary Examiner* — Giovanna B Colan
(74) *Attorney, Agent, or Firm* — Jared C. Chaney

(57) ABSTRACT

A method for an optimized search service comprising a search engine, two search indexes and a search term suggestion service may be provided. The method comprises collecting search queries, search results and search term suggestions, determining an acceptance rate value for each search term suggestion for the two search indexes, determining a first search configuration of a first index having an acceptance rate value below a first threshold value, determining a second search configuration of a second index including parameters for controlling search term suggestions for at least one search index having an acceptance rate value above a second threshold value, and having a search configuration that is compatible according to a compatibility value to the first search configuration, wherein the first index and the second index have similar content, and copying a selected set of parameters of the configuration of the second search index into the first index.

20 Claims, 9 Drawing Sheets

(56) References Cited

OTHER PUBLICATIONS

Kuznetsov et al., "The CMS Data Aggregation System," Elsevier Ltd., ScienceDirect, International Conference on Computational Science, ICCS 2010, Procedia Computer Science 1 (2012) 1535-1543, 9 pages, http://dx.doi.org/10.1016/j.procs.2010.04.172.
Mell et al., "The NIST Definition of Cloud Computing," Recommendations of the National Institute of Standards and Technology, U.S. Department of Commerce, Special Publication 800-145, Sep. 2011, 7 pages.

\* cited by examiner

OPTIMIZED SEARCH SERVICE

BACKGROUND

Aspects of the present disclosure relate to computer-implemented method for an optimized search service, more particular aspects relate to a related search system for an optimized search service, and a computer program product.

SUMMARY

Some embodiments of the present disclosure can be illustrated by a method comprising optimizing a search service. In some embodiments, the method includes receiving a first search configuration for a search service, where the first search configuration includes first search term suggestions, a first acceptance rate value, and first search parameters for controlling a first search, where the first acceptance rate value is low, receiving a search log comprising one or more log search configurations, where an example search configuration in the search log comprises log search parameters, search term suggestions, and acceptance rate values, analyzing the search log for configurations with a high acceptance rate value, comparing the first search parameters to the log search parameters in the search log, identifying log search configurations that have an acceptance rate value that exceeds a threshold and are compatible with the first search configuration, selecting, from the search log based on the identifying, a model log search configuration, replacing a variable parameter in the first search parameters with a respective parameter from the model log search configuration resulting in a second search configuration, and performing a search with the second search configuration.

According to one aspect of the present disclosure, a computer-implemented method for an optimized search service may be provided. The search service may comprise a search engine, at least two search indexes and a search term suggestion service. Each search index may comprise a search configuration including parameters for controlling search term suggestions for the search terms suggestion service. The method may comprise collecting search queries, respective search results and respective search term suggestions in a search log, determining an acceptance rate value for each search term suggestion for each one of the at least two search indexes in the search log, and determining a first search configuration of a first index including parameters for controlling search term suggestions for a search index having an acceptance rate value below a first threshold value.

The method may further comprise determining a second search configuration of a second index including parameters for controlling search term suggestions for at least one search index having (a) an acceptance rate value above a second threshold value and having (b) a search configuration that is compatible according to a compatibility value to the first search configuration, wherein the first index and the second index have similar content, and copying a selected set of parameters of the configuration of the second search index into the first index.

According to another aspect of the present invention, a search system for an optimized search service unit may be provided. The search service unit may comprise a search engine, at least two search indexes and a search term suggestion service module. Each search index may comprise a search configuration including parameters for controlling search term suggestions for the search terms suggestion service module. The system may comprise a storage module adapted for storing collected search queries, respective search results and respective search term suggestions in a search log, and an acceptance rate determination module adapted for determining an acceptance rate value for each search term suggestion of the search term suggestion service module for each one of the at least two search indexes in the search log.

The acceptance rate determination module may be also adapted for determining a first search configuration of a first index including parameters for controlling search term suggestions for a search index having an acceptance rate value below a first threshold value, as well as, for determining a second search configuration of a second index including parameters for controlling search term suggestions for at least one search index having (a) an acceptance rate value above a second threshold value and having (b) a search configuration that may be compatible according to a compatibility value to the first search configuration, wherein the first index and the second index have similar content. Additionally, the system may comprise a copy unit adapted for copying a selected set of parameters of the configuration of the second search index into the first index.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

Figure 1:
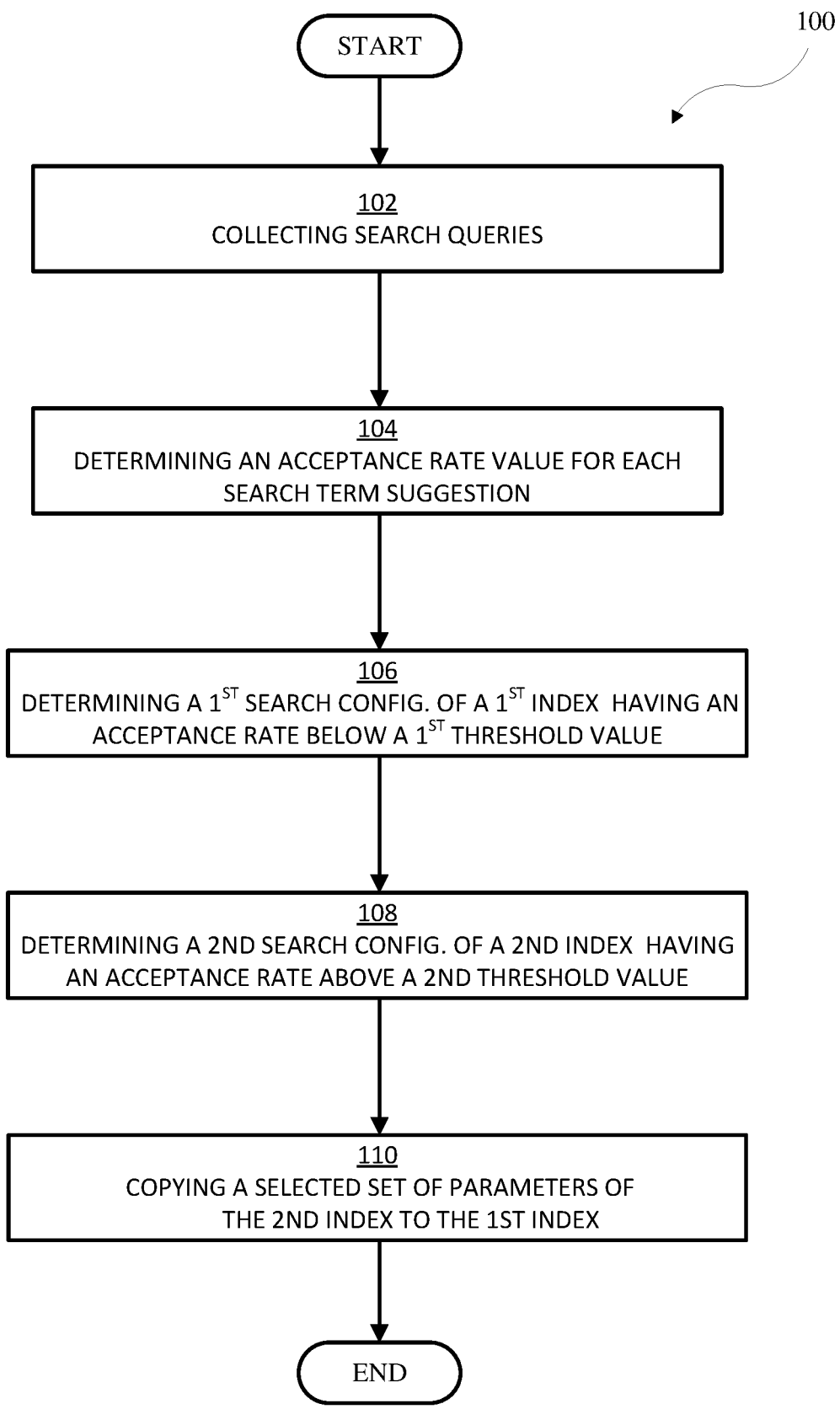
FIG. 1 is a block diagram illustrating a computer-implemented method for an optimized search service.

Managing large amounts of data continues to be a key challenge for individuals as well as for enterprises. Often, cloud solutions—either on premise or as a true, remote cloud computing solution—are used to search for content. Thus, cloud services require a search service instrumental to find and retrieve information resources for further use. Such services may typically support multiple tenants by separating and/or organizing information in a tenant specific way.

For a search service, this typically implies maintaining one or more search collections per tenant, which itself may put a lot of load on the search service; i.e., thousands of search collections may need to be updated and searched through.

In order to deliver satisfactory services, a search service needs to be able to return a list of documents comprising the term a user is looking for in a sub-second response time. Users typically do not accept significant delays for the search requests and expect nearly perfect results from the search service including a proper scoring or ranking of the documents listed as a search result. Such proper results depend strongly on the content and configuration of a search index, used for, for example, a tenant. However, in some cases the index for specific tenant are eventually not ideal, for example, because a new tenant may use the search service in a start period. A tenant can be seen as an enterprise with a plurality of individual users. Hence, there is a need for optimizing the search results for a tenant.

In some embodiments, term 'search service' may denote a computer supported service—sometimes implemented using a micro-services architecture—for identifying content items in a collection of content items. The content items may be text documents (in any format), images, audio files and/or video files. Often the documents may be denoted as documents. Also, often the documents may be managed and organized by a content management system.

In some embodiments of the present disclosure, a search service receives a first search configuration with a low acceptance rate. In some embodiments, low acceptance rate denotes that one or more of the suggestions was not accepted when using the first search configuration. In some embodiment, the threshold for low acceptance rate can be set. In some embodiments, a search configuration can include first search term suggestions, a first acceptance rate value, and first search parameters for controlling a first search. In some embodiments, parameters for controlling a search can include field/data structure, analyzer chains. In some embodiments, a recommendation component of the search service monitors, analyzes and/or compares current and/or historical search configurations containing user behavior, subject matter of a document (in which the search is taking place) language of search, field of endeavor of the document, comparison of content to similar documents, and/or etc. In some embodiments, the search results will be one or more actual search results, one or more categories of search results, one or more subjects of the search results, and/or one or more characteristics of the search results.

In some embodiments, the search service, or a linked computer system, can receive a search log. For example, the search log could include one or more search configurations where each search configuration includes log comprises log search parameters, search term suggestions, and acceptance rate values. In some embodiments, the search log will be analyzed for configurations with a high acceptance rate value. In some embodiments, one or more of the search configurations in the search log can be compared to the first search configuration. In some embodiments, a candidate or model search configuration will be selected from the search log based on an acceptance rate and a degree of compatibility identified. In some embodiments, a variable parameter in the first search parameters with a respective parameter from the model log search configuration resulting in a second search configuration and a new search will be performed using the second search configuration.

In some embodiments, term 'search engine' may denote a component of a search service. The search engine may be enabled to identify documents comprising a received search term. The search engine may use indexes for identifying documents fast.

In some embodiments, term 'index' or 'search index' may denote a sort of a repository maintaining terms identified during an indexing process of a search corpus, as well as a pointer to the original document in the corpus of document or content items. Search indexes may be maintained—for example, often in the main memory of a computer system—in order to decrease the response time for individual search requests.

In some embodiments, term 'search body' may denote the corpus or the entirety of documents or content items accessible by the search service. The search body may logically be split into a plurality of document groups belonging or owned by different user groups.

In some embodiments, term 'content item' may denote the smallest identifiable part in a search body. A content item may be a document, an image, an audio file, a spreadsheet, a map and/or combination thereof.

In some embodiments, term 'search term suggestion service' may denote a function related to a graphical user interface that may react to inputs of single characters or a group of characters typed in by a user. In some embodiments, search term suggestion service may propose a complete search term before the user has finished typing. For example, if the user has typed ˹ca˼, the search term suggestion service may complete the search term to ˹car˼. In another example, and referring to a spellcheck function of the search term suggestion service, the search term suggestion service may correct the term ˹cra˼ to ˹car˼ or a plurality of other terms from which one may be selected. Thus, the term 'spellchecking' may denote a software feature that may check for misspellings in a text or text fragment, for example, a search term for a search service. In some embodiments, a multi-tenant CMS may automatically recommend improved parameters for distance calculation-based functionality like spellchecking, type-ahead and auto-complete suggestions or comparisons.

In some embodiments, the term 'selected set of parameters' may denote—in the context of search index configuration—variables by which the index has been built or how the scoring or ranking of search results are operated. For example, the ranking method tf-idf (short for term frequency/inverse document frequency) may be influenced by changing weight factors. Another example for parameters may be related to the kind of search used for string, sub-string of field search, etc. Another set of parameters may be related to search index statistics, i.e., collected values for deriving a search statistic.

In some embodiments, term 'similar search configuration' may denote that at least a portion of the parameters (or query characteristic parameters) of the search configuration may be equal. The similarity may be influenced by a presetting defining which parameters should be identical and which ones do not need to be identical. A similarity value may be derived based on a percentage of similar parameters. The similarity may also be related to a schema related to a second index.

In some embodiments, term 'compatible'—in particular a compatible search configuration according to a compatibility value—may denote that two indexes may be equal enough that parameters having a dedicated meaning are also applicable in a second index. The compatibility value may here be a synonym for similarity value (see above). For example, a first search configuration could be compatible to the second search configuration of the (target) tenant (e.g., having similar field/data structure, analyzer chains, . . . ).

In some embodiments, term 'similar content'—in particular, similar content of the first and the second index—may denote that the differences between the first index and the second index have differences below a threshold value. The differences may, for example, be related to a sorted list of search terms, wherein the sorting may be related to an occurrence count of a search term in a given time period. Those search terms at the top of the list (highest occurrence) may have a higher weight in a determination algorithm for determining the similarity. Also dictionaries of repositories of synonyms may be used for a determining of a similarity. The higher the rate of equal search terms in a sorted index is, the higher the similarity rate may be.

In some embodiments, term 'search queries' may denote an expression used as input of a search service to produce a list of content items (e.g., documents) comprising the search term. Consequently, the term 'search results' may denote the list of found content items by the search service.

In some embodiments, term 'search log' may denote historic—i.e., before the current search operation—search terms, search results and also search suggestions, recommendations, spellchecked terms and type-ahead terms, and autocomplete.

In some embodiments, term 'acceptance rate value' may denote a determined value indicating that the number or the percentage of suggested or recommended terms have been accepted and used by a user instead of his typed or used search term of a fraction of a search term.

In some embodiments, term 'document body' may denote a plurality of content items managed by a content management system. The entirety of the content items of a search service address in a particular configuration may also be denoted as corpus.

In some embodiments, term 'search index configuration' or 'search configuration' may denote the way a search index may be operated. Each index may have a schema: The schema may be the place that instructs the search service how to build indexes from input documents, i.e., content items. Each schema may contain one or more fields. Fields may comprise different kinds of data. A name field could, for example, be simple text (character data). A screw size field might be a floating point number, so that it could contain values like 6 and 9.5. The definition of fields may be flexible (one could define a screw size field as a text field rather than a floating-point number, for example), but if the fields are defined correctly, the search engine will be able to interpret them correctly and the users will be able to obtain better results when they perform a query.

In some embodiments, term 'tenants' may denote here a group of users of a search service. Modern cloud solutions are able to serve multiple tenants with one deployment. A tenant may be a group of users (e.g., of a company) who share a common access with specific privileges to the software instance. The service infrastructure and the search service may ensure that tenant specific data is isolated from other tenants. Typically, client requests and service requests contain a tenant id of the tenant which is associated with a request, which allows the service infrastructure component to establish the required context and state for processing the request.

In some embodiments, term 'type-ahead' may denote a feature of computers and software that may enable users to continue typing regardless of program or computer operation; the user may type in whatever speed is desired. If the receiving software is busy at the time, it will be called to handle this later. Often this means that keystrokes entered will not be displayed on the screen immediately. This programming technique for handling uses what is known as a keyboard buffer.

In some embodiments, term 'autocomplete' may denote a feature in which an application, here the search service, predicts the rest of a word a user is typing. In graphical user interfaces, users can typically press the "tab" key to accept a suggestion or the down arrow key to accept one of several. Autocomplete has the advantage of speeding up human-computer interactions when it correctly predicts the word a user intends to enter after only a few characters have been typed into a text input field. It works best in domains with a limited number of possible words, when some words are much more common, or writing structured and predictable text. Other autocomplete algorithms learn new words after the user has written them a few times and can then suggest alternatives based on the learned habits of the individual user or a group of users, i.e., a tenant.

In some embodiments, term 'content management system'—in short CMS—may denote a computer supported system for managing creation and modification of digital content. It may typically support multiple users in a collaborative environment. CMS features may vary widely. Most CMS s include Web-based publishing, format management, history editing and version control, indexing, search, and retrieval. By their nature, content management systems may support the separation of content and presentation. For example, a web content management system (WCM or WCMS) is a CMS designed to support the management of the content of Web pages. Most popular CMSs are also WCMSs. Web content includes text and embedded graphics, photos, video, audio, maps, and program code (e.g., for applications) that displays content or interacts with the user.

In some embodiments, proposed computer-implemented method for an optimized search service may offer multiple advantages and technical effects:

In some embodiments, overall performance of the search service may be optimized. Recommending search terms that may successfully be used and adapted by the users of one tenant to another tenant may save setup and training/learning time for the second tenant or rather the suggestion model used for the second tenant. Such an approach may work well if users of both tenants have an identical search body, i.e., search in the same set of searchable content items, i.e., in the same corpus.

However, in some embodiments, proposed method may also work if the corpuses are not identical but similar. The similarity may be determined by comparing the documents of the two corpuses. If a predefined number of content items are identical in both corpuses then a similarity may be assumed.

In some embodiments, the system may enhance the quality of the user experience and—at the same time—decrease the administrative costs. This may typically happen, during on-boarding processes of new tenants. They may experience the advantages of the CMS and/or search service from the beginning.

For example, a web shop may be implemented on the basis of a CMS: Here, all artefacts and code (like HTML pages, product information, code snippets) required by the web shop may be stored and managed in the CMS. The artefacts like product information may be indexed in the search index, i.e., the search engine. A user of the web shop (who may be a potential buyer) may use the search service that is part of the CMS to navigate in the web shop and to search for products. Thus, the end user may depend on the quality of the search results and the search suggestions to be able to find the products he or she is interested in. If he or she is not able to find the products in the web shop, he or she will eventually not buy the products in this web shop (resulting in lower revenue for the web shop), but instead may visit another web shop of a competitor. Probably, the user will avoid this current web shop completely in the future based on the comparably bad search quality he or she has experienced.

Therefore, the success—including the financial success—of the web shop may directly depend on the quality of the search results and the search suggestions.

In another example, a patent or prior art database may be implemented on the basis of a CMS. Good search quality and high quality search suggestions are important to the users of the system. High quality searches will make the results more relevant and increase user productivity.

High quality search suggestions may especially be important for users when browsing for discovery or research of, for example, products in a web shop or of either inspiration or prior art in a patent database. In some embodiments, search suggestions (as well as spell-check corrections) may help the user in creating effective and efficient searches. Without any help in creating the searches, the user may experience sub-standard search quality and may get frustrated with the system. By missing the required information, he or she may not be able to do his or her work or to buy the products he or she is interested in.

In another example, the search service may be used by content authors of the CMS while creating, editing and managing content items. Again, good search quality and high quality search suggestions may also be important also for the authors. User experience and the productivity (and thus the financial success of the employer of the content authors) of the content authors may directly depend on the search quality.

According to some embodiments of the method, the acceptance rate value for search term suggestions of an index may be an average acceptance value for all search suggestion terms of the related index. The acceptance value may be expressed as a STAM value, i.e., Suggestion and Type-Ahead Metric value. An average value may be built across search terms for which suggestion and type-ahead acceptance rate values may be available. Alternatively, a weighted average value may be used. For example, those search terms with a higher use frequency and the related suggestions and type-ahead terms may get a higher weight, (e.g., linear, quadratic or exponential).

According to some embodiments of the method, the selected set of parameters may be predefined or dynamically determined. Thus, it is not required to copy the complete set of parameters for search suggestions and/or type-ahead recommendations from the index of one tenant to another. In some embodiments, only a predefined set of parameters may be sufficient to increase the performance of the search service for a second tenant for which the performance was under average. It may also be possible to select parameters dynamically. If the parameters may be hierarchically organized (e.g., in an XML document) the method may select a suitable top-level parameter and the lower-level parameters can be copied completely or up to a predefined lower-level.

According to some possible embodiments of the method, the compatibility value may be indicative of identical search configurations, for example, having identical fields, identical data structures, analyzer chains, tokenizers, etc.

According to some embodiments of the method, the compatibility value may be indicative of similar search configurations, for example, belonging to the same class of analyzers and tokenizers. This way, a larger number of indexes of tenants may be made more performant using the search knowledge of user of other tenants. The term performance may here be understood as the possibility to deliver better search results.

According to some embodiments of the method, the search service may operate on a document body, i.e., corpus, of a content management system accessed by multiple tenants. The proposed method may be particularly helpful because the possibility that two tenants use the same subset of documents—i.e., content items—in a very comparable or similar way can be comparably high.

According some embodiments of the method, each index is tenant specific. However, it may also be possible that tenants share a joint index or there may be more than one index per tenant, down to one index per user of a tenant.

According to some embodiments, the search term suggestion may comprise at least one of the functions of the group comprising spellchecking, type-ahead and autocomplete. The similarity between the already typed letters of a search term and the search term suggestion may be distance based. A list of known examples follows:

AnalyzingLookupFactory: A lookup that first analyzes the incoming text and adds the analyzed form to a weighted FST, and then does the same thing at lookup time.

FuzzyLookupFactory: This is a suggestion which is an extension of the AnalyzingSuggester but is fuzzy in nature. The similarity is measured by the Levenshtein algorithm. Fuzzy logic is an approach to computing based on "degrees of truth" rather than the usual "true or false" (1 or 0) Boolean logic on which the modern computer is based.

AnalyzingInfixLookupFactory: Analyzes the input text and then suggests matches based on prefix matches to any tokens in the indexed text. This uses a Lucene index for its dictionary.

BlendedInfixLookupFactory: An extension of the AnalyzingInfixSuggester which provides additional functionality to weight prefix matches across the matched documents. You can tell it to score higher if a hit is closer to the start of the suggestion or vice versa.

FreeTextLookupFactory: It looks at the last tokens plus the prefix of whatever final token the user is typing, if present, to predict the most likely next token. The number of previous tokens that need to be considered can also be specified. This suggester would only be used as a fallback, when the primary suggester fails to find any suggestions.

FSTLookupFactory: An automaton-based lookup. This implementation is slower to build, but provides the lowest memory cost. We recommend using this implementation unless you need more sophisticated matching results, in which case you should use the Jaspell implementation.

TSTLookupFactory: A simple compact ternary trie based lookup.

WFSTLookupFactory: A weighted automaton representation which is an alternative to FSTLookup for more fine-grained ranking. WFSTLookup does not use buckets, but instead a shortest path algorithm. Note that it expects weights to be whole numbers. If weight is missing it's assumed to be 1.0. Weights affect the sorting of matching suggestions when spellcheck.onlyMorePopular=true is selected: weights are treated as "popularity" score, with higher weights preferred over suggestions with lower weights.

JaspellLookupFactory: A more complex lookup based on a ternary trie from the JaSpell project. Use this implementation if you need more sophisticated matching results.

In some embodiments, the same may apply for dictionaries. A list of exemplary implementation options follows:

DocumentDictionaryFactory: A dictionary with terms, weights, and an optional payload taken from the index.

DocumentExpressionDictionaryFactory: This dictionary implementation is the same as the DocumentDictionaryFactory but allows users to specify an arbitrary expression into the 'weightExpression' tag.

HighFrequencyDictionaryFactory: This dictionary implementation allows adding a threshold to prune out less frequent terms in cases where very common terms may overwhelm other terms.

FileDictionaryFactory: This dictionary implementation allows using an external file that contains suggested entries. Weights and payloads can also be used.

In some embodiments, open source enterprise search platforms may require a request handler to process suggestion/spellchecking requests; this request handler also has a set of possible configuration options such as language, regional dialect, technological field, practice area, etc.

In some embodiments, following shows names of possible dictionary components configured in the search suggest.dictionary component. In some embodiments, a dictionary component may be a mandatory parameter. In some embodiments, a dictionary component can be set in the request handler or sent as a parameter at query time.

suggest.q The query to use for suggestion lookups.

suggest.count Specifies the number of suggestions for open source enterprise search platform to return.

suggest.cfq A Context Filter Query used to filter suggestions based on the context field, if supported by the suggester.

suggest.build If true, it will build the suggester index. This is likely useful only for initial requests; you would probably not want to build the dictionary on every request, particularly in a production system. If you would like to keep your dictionary up to date, you should use the buildOnCommit or buildOnOptimize parameter for the search component.

suggest.reload If true, it will reload the suggester index.

suggest.buildAll If true, it will build all suggester indexes.

suggest.reloadAll If true, it will reload all suggester indexes.

In some embodiments, the search service may use an open source enterprise search platform. Thus, the here proposed concepts extend the currently often used technologies for search service advantageously.

According to another embodiment of the method, a similar content of the first and the second index may be determined by the percentage of identical terms in the first and the second index. Having the same or similar indexes may also suggest that the corpuses of the different tenants may also be identical or similar. Thus, a cross-usage of search term suggestions, type-ahead recommendations of spell-check corrections may be especially effective for better user experience and higher user productivity.

In the following, a detailed description of the figures will be given. All instructions in the figures are schematic. Firstly, a block diagram of an embodiment of the inventive computer-implemented method for an optimized search service is given. Afterwards, further embodiments, as well as embodiments of the search system for an optimized search service will be described.

FIG. 1 shows an exemplary block diagram of an embodiment of the computer-implemented method 100 for an optimized search service. The search service comprises a search engine, at least two search indexes and a search term suggestion service, for example, spellchecking, type-ahead, autocomplete of a search term at typing time. Each search index comprises a search configuration including parameters for controlling search term suggestions for the search term suggestion service. The method 100 comprises collecting, 102, search queries, respective search results and respective search term suggestions in a search log, determining, 104, an acceptance rate value (e.g., an average value over all search terms) for each search term suggestion for each one of the at least two search indexes in the search log, and determining, 106, a first search configuration of a first index including parameters for controlling search term suggestions for a search index having an acceptance rate value below a first threshold value.

Furthermore, the method may comprise determining, 108, a second search configuration of a second index including parameters for controlling search term suggestions for at least one search index having (a) an acceptance rate value above a second threshold value and having (b) a search configuration that is compatible according to a compatibility value to the first search configuration, wherein the first index and the second index have similar content—i.e., have a content similarity rate above a threshold value—and copying, 110, a selected set of parameters of the configuration of the second search index into the first index, i.e., thereby., replacing existing parameters. Naturally, the second threshold value may be higher than the first threshold value.

Figure 2:
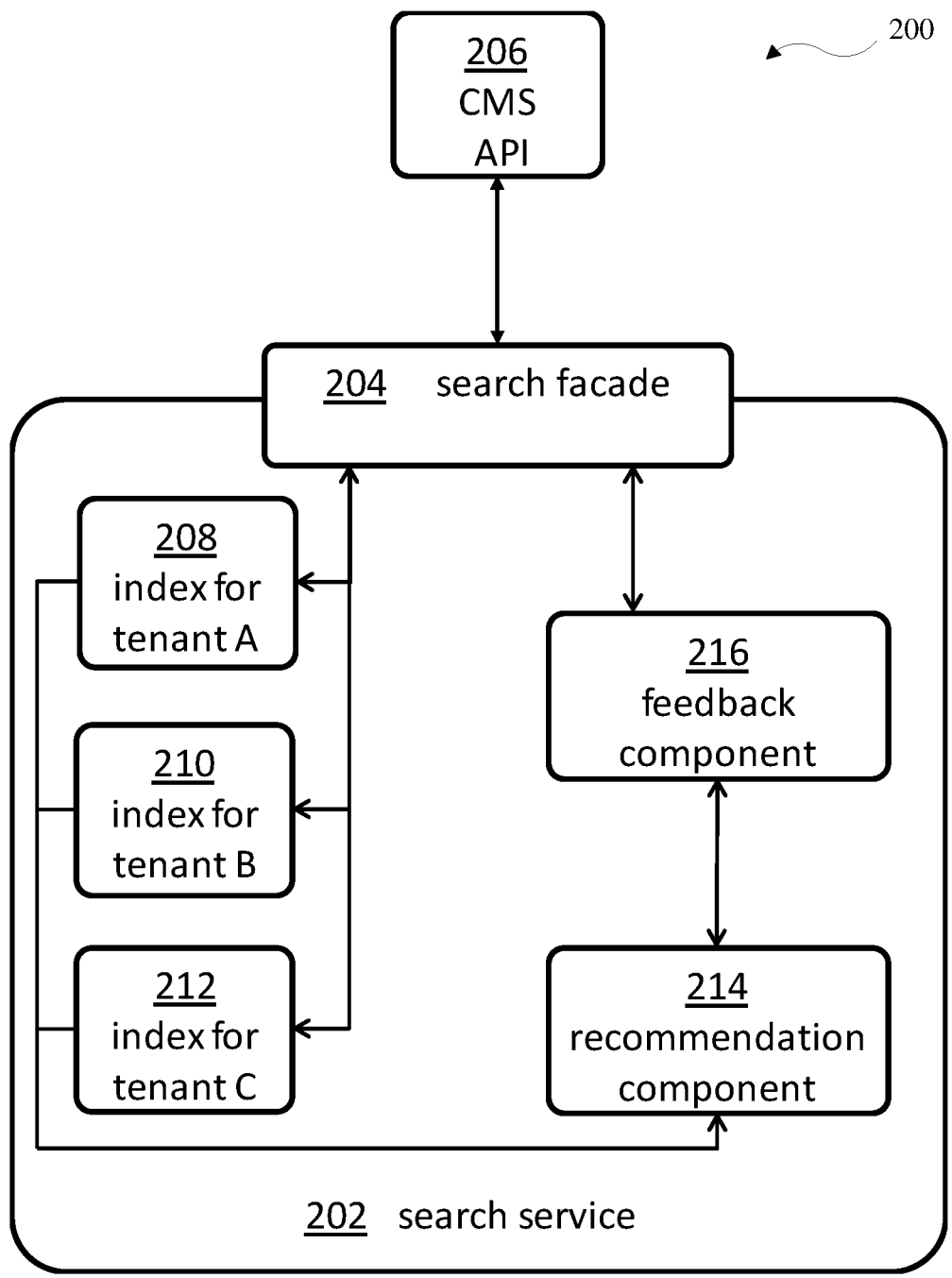
FIG. 2 is a block diagram illustrating an exemplary enhanced search service.

FIG. 2 shows a block diagram 200 of an embodiment of the here proposed enhanced search service 202. As reference point, a known search service 202 is shown comprising search indexes 208, 210, 212. Access to the search service is possible via the search façade 204 (basically a search service API—application programming interface). There may be an API 206 from the perspective of a CMS. In some embodiments, the search façade 204 interacts with the search indexes 208, 210, 212 for the different tenants A, B, C. However, the search indexes 208, 210, 212 output their results to a new recommendation component 214 that interacts with a new feedback component 206 that monitors and tracks the recommendations for search term suggestions as well as those terms that are accepted by users. From this, the acceptance rate is determined. The higher the percentage of accepted suggestions, the better the suggestions and thus the current suggestion's configuration is. This is then used for selecting a set of the best distance parameters and recommends these settings to selected other tenants that have a similar corpus. This helps administrators of the search service 202 to better configure the CMS and the search service which in turn improves user experience and productivity and lowers administrative cost at the same time.

Figure 3:
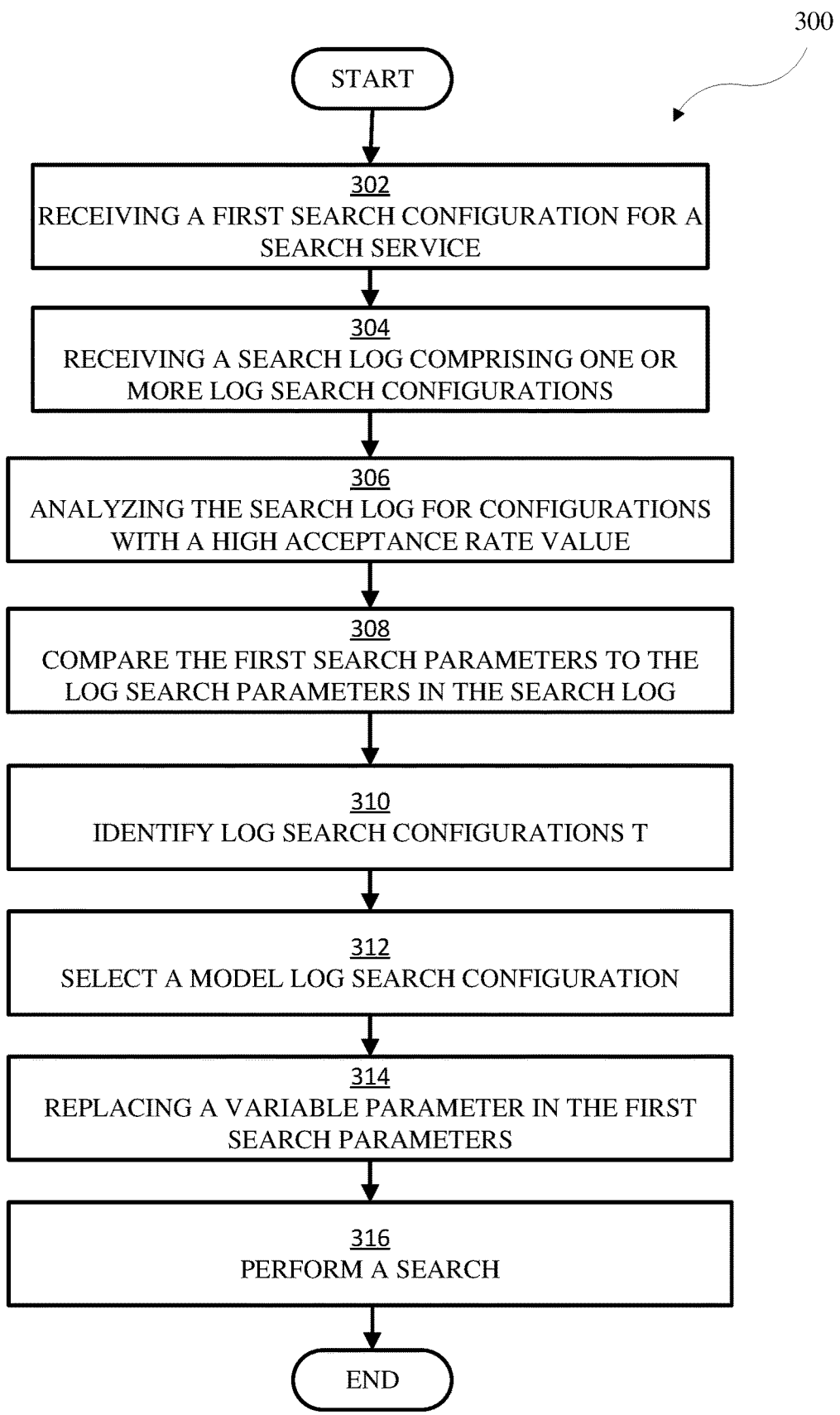
FIG. 3 illustrates an example method 300 of optimizing a search service, in accordance with embodiments.

FIG. 3 illustrates an example method 100 of an optimized search service. At block 302, a first search configuration with a low acceptance rate is received. In some embodiments, the first search configuration includes first search term suggestions, a first acceptance rate, and first search parameters for controlling a first search. For example, the first search could be based on a recently performed search where none of the suggestions were accepted, or the first search could be based on a number of searches using the first search configuration.

At block 304, a search log is received. In some embodiments, the search log will contain a record of previously performed searches with a variety of search configurations. In some embodiments, an example search configuration in the search log comprises log search parameters, search term suggestions, and acceptance rate values. In some embodiments, search information will regularly be stored in the log for future use.

At block 306, the search log will be analyzed for configurations with a high acceptance rate value. In some embodiments, a threshold value for the high acceptance rate can be a fixed value, a percentage of candidate configurations, or a top number of candidate configurations.

At block 308, the first search parameters will be compared to the log search parameters in the search log. In some embodiments, the comparison will determine which of the candidate configurations most closely match key parameters of the first search parameters.

At block 310, log search configurations that have an acceptance rate value that exceeds a threshold and are compatible with the first search configuration will be identified.

At block 312, a model log search configuration will be selected. In some embodiments, the selection will be based on the acceptance rate value of the log search configurations. In some embodiments, the selection will be based on the compatibility of the log search configurations with the first search configuration.

At block 314, a variable parameter in the first parameters will be replaced with a respective parameter from the model log search configuration resulting in a second search configuration.

At block 316, a search will be performed with the second search configuration. In some embodiments the new or second search will be compared to the first search to determine if the second search had an improved acceptance rate.

Figure 4:
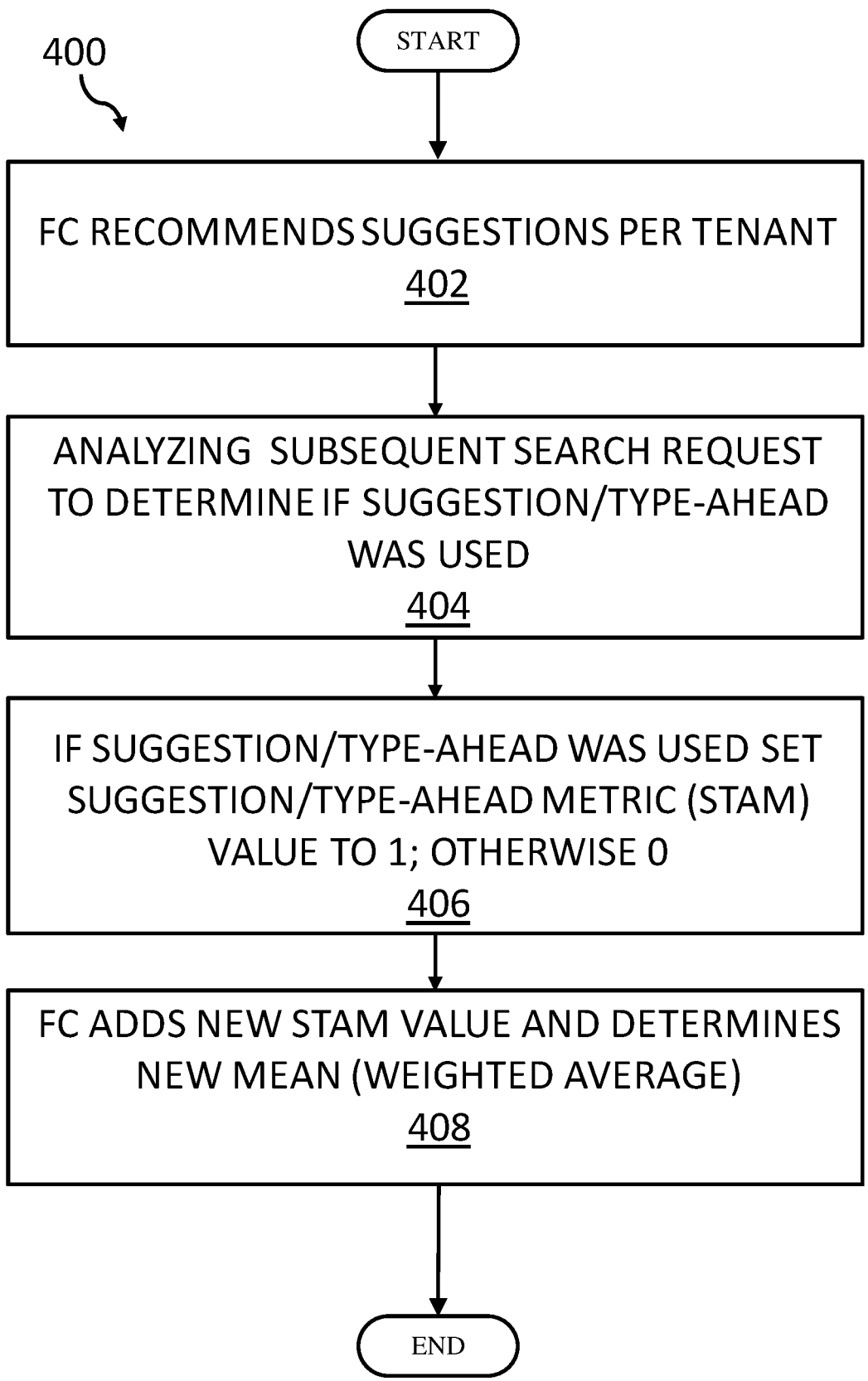
FIG. 4 is a block diagram of an exemplary flow chart for a determination of the quality of the spellchecking and type-ahead suggestions.

FIG. 4 shows a block diagram of an exemplary flow chart 400 for a determination of the quality of the spellchecking and type-ahead suggestions. The process starts with a search feedback component (for example, see FIG. 2, 216) recommending suggestions per tenant, 402. Then, subsequent search requests are analyzed to determine if a suggestion or a type-ahead term was actually used, 404. If the suggestion or type-ahead term was used, a set suggestion/type-ahead metric (STAM) value is set to "1"; if it was not used, the STAM value is set to "0", 406. The feedback component adds the new STAM value to previously determined STAM values and determines a new mean acceptance value as a quality measure for the search parameter setting in respect to the corpus, 408.

Figure 5:
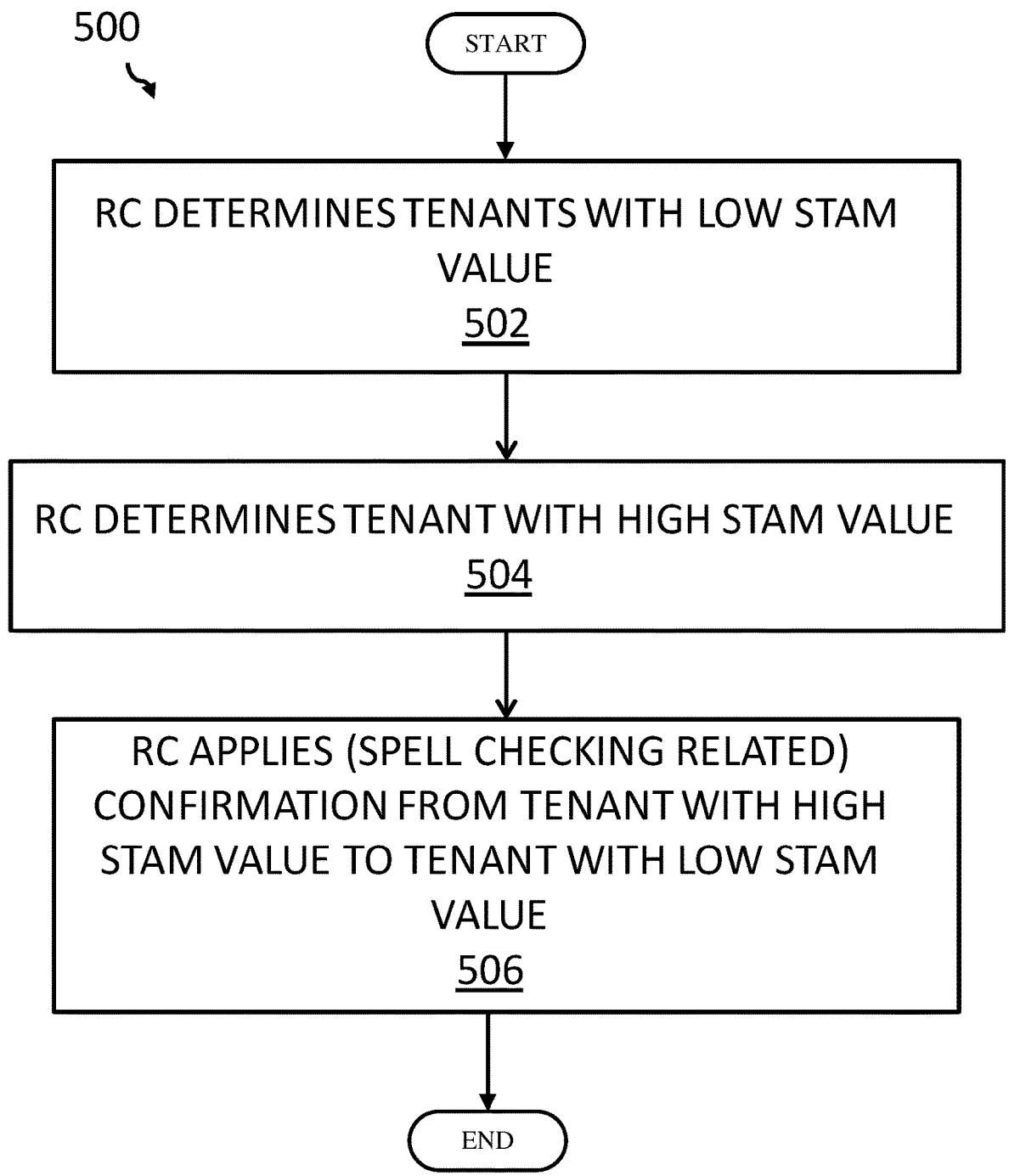
FIG. 5 illustrates an exemplary flow chart for recommendations by a recommendation component.

FIG. 5 shows a block diagram of an exemplary flow chart 500 for recommendations by a recommendation component (RC). The recommendation component (for example, see FIG. 2, 214) determines STAM values for tenants and thereby determines a tenant with a low STAM value (502) and another tenant with a higher STAM value (504) by comparison of the STAM values of the different tenants. As a result, the recommendation component applies, 506—in particular spell-checking related—configurations from the tenant with the high STAM value to the other tenant with the lower STAM value. This way, the tenant with the lower STAM value can benefit from earlier experiences.

Figure 6:
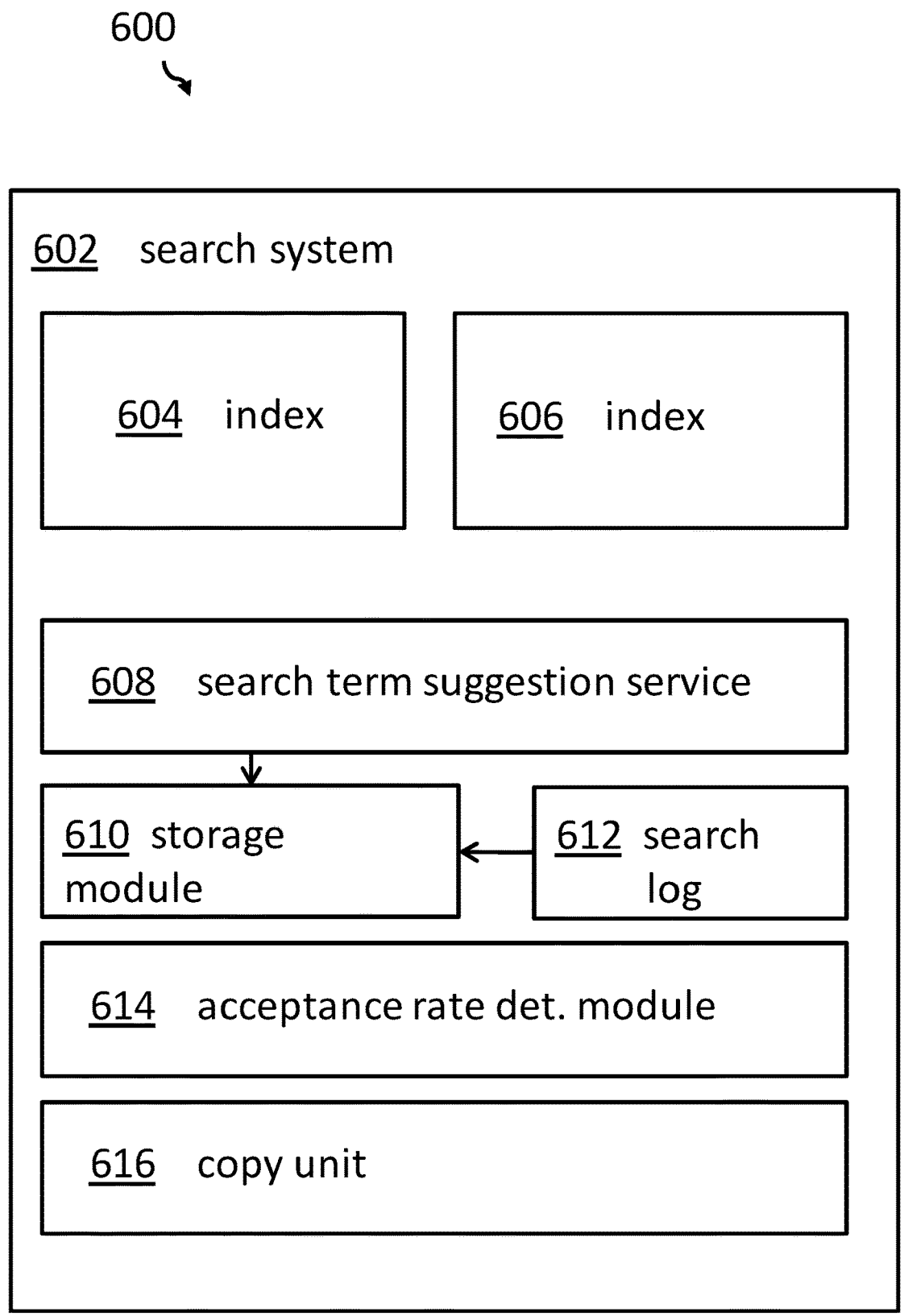
FIG. 6 illustrates an example flow diagram for a search system.

FIG. 6 shows an exemplary block diagram of the proposed optimized search service 600. The exemplary search service comprises a search engine 602, at least two search indexes 604, 606 and a search term suggestion service unit 608. Each search index 604, 606 may include a search configuration including parameters for controlling search term suggestions for a search terms suggestion service. The system comprises a storage module 610 adapted for storing collected search queries, respective search results and respective search term suggestions of the search term suggestion service unit 610 in a search log 612.

In some embodiments, search system 602 may include an acceptance rate determination module 614 adapted for determining an acceptance rate value for each search term suggestion for each one of the at least two search indexes 604, 606 in the search log 612. In some embodiments, acceptance rate determination module 614 is also adapted for determining a first search configuration of a first index including parameters for controlling search term suggestions for a search index having an acceptance rate value below a first threshold value. Furthermore, the acceptance rate determination module may also be adapted for determining a second search configuration of a second index including parameters for controlling search term suggestions for at least one search index having (a) an acceptance rate value above a second threshold value, and having (b) a search configuration that is compatible according to a compatibility value to the first search configuration, wherein the first index and the second index have similar content.

In some embodiments, the system includes a copy unit 616 adapted for copying a selected set of parameters of the configuration of the second search index 606 into the first index 604.

Figure 7:
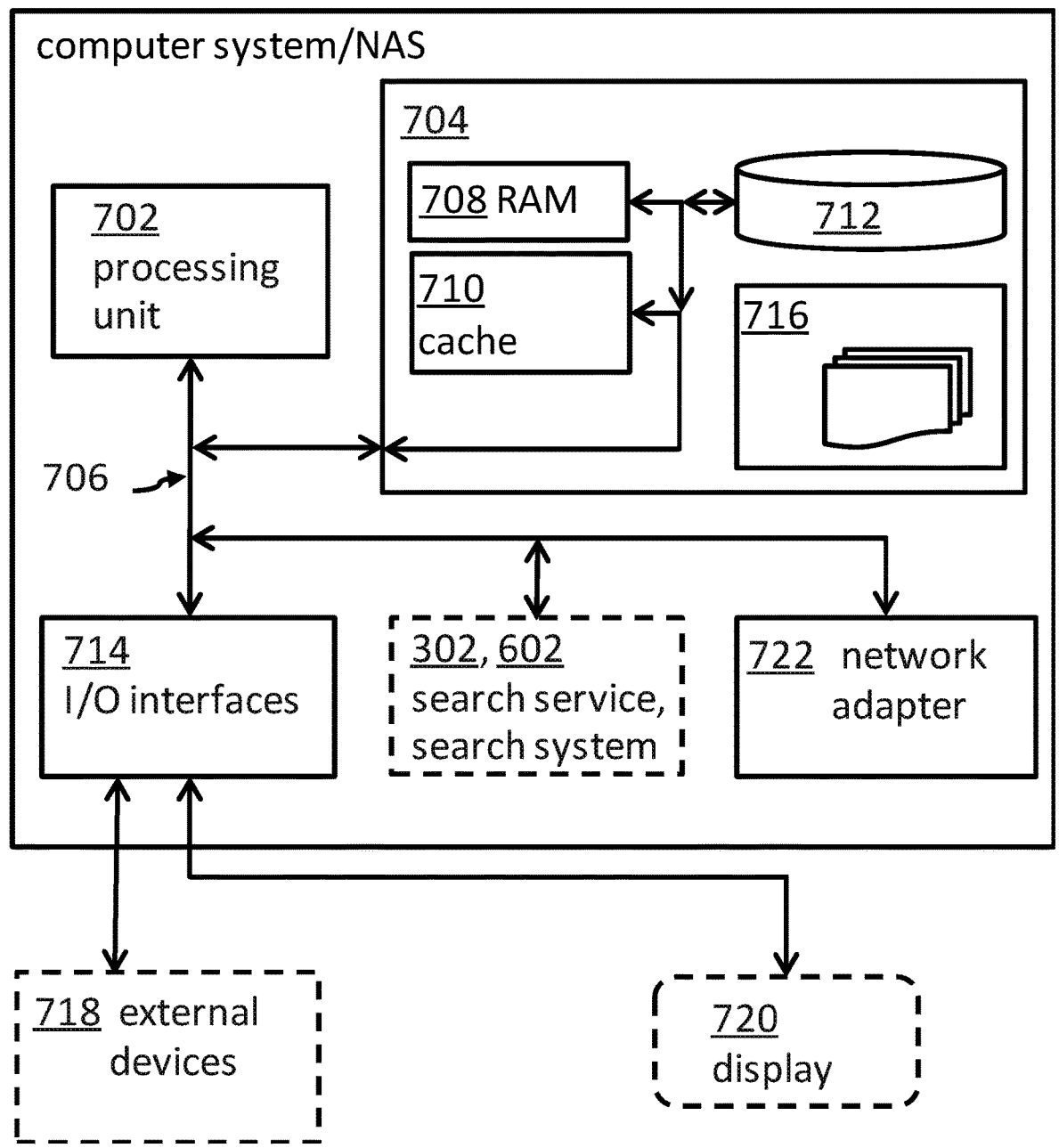
FIG. 7 depicts a computer system according to various embodiments of the present invention.

FIG. 7 shows, as an example, a computing system 700 suitable for executing program code related to the proposed method and optionally comprising the proposed search system.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the search system for an optimized search service 600 (or the search system 202 of FIG. 2) may be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
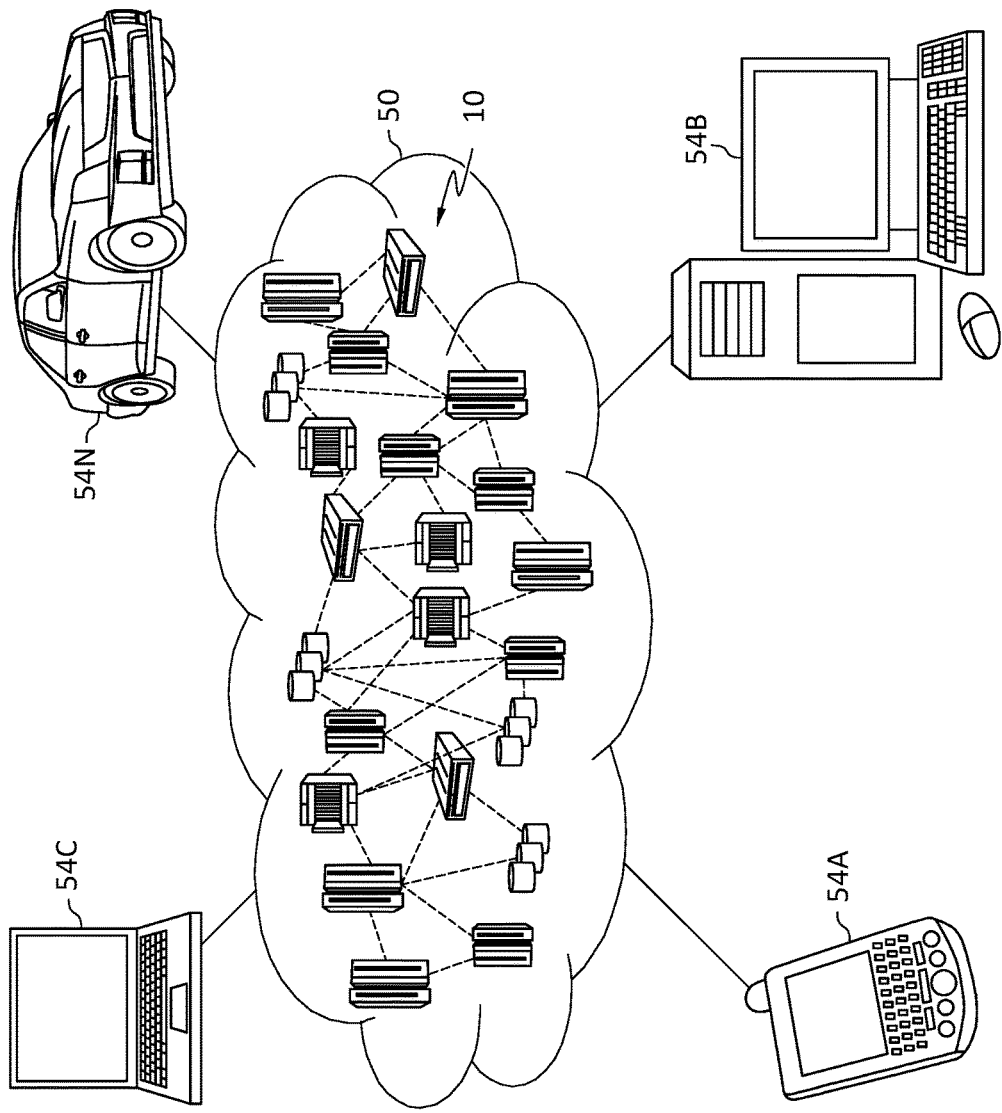
FIG. 8 depicts a cloud computing environment according to various embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
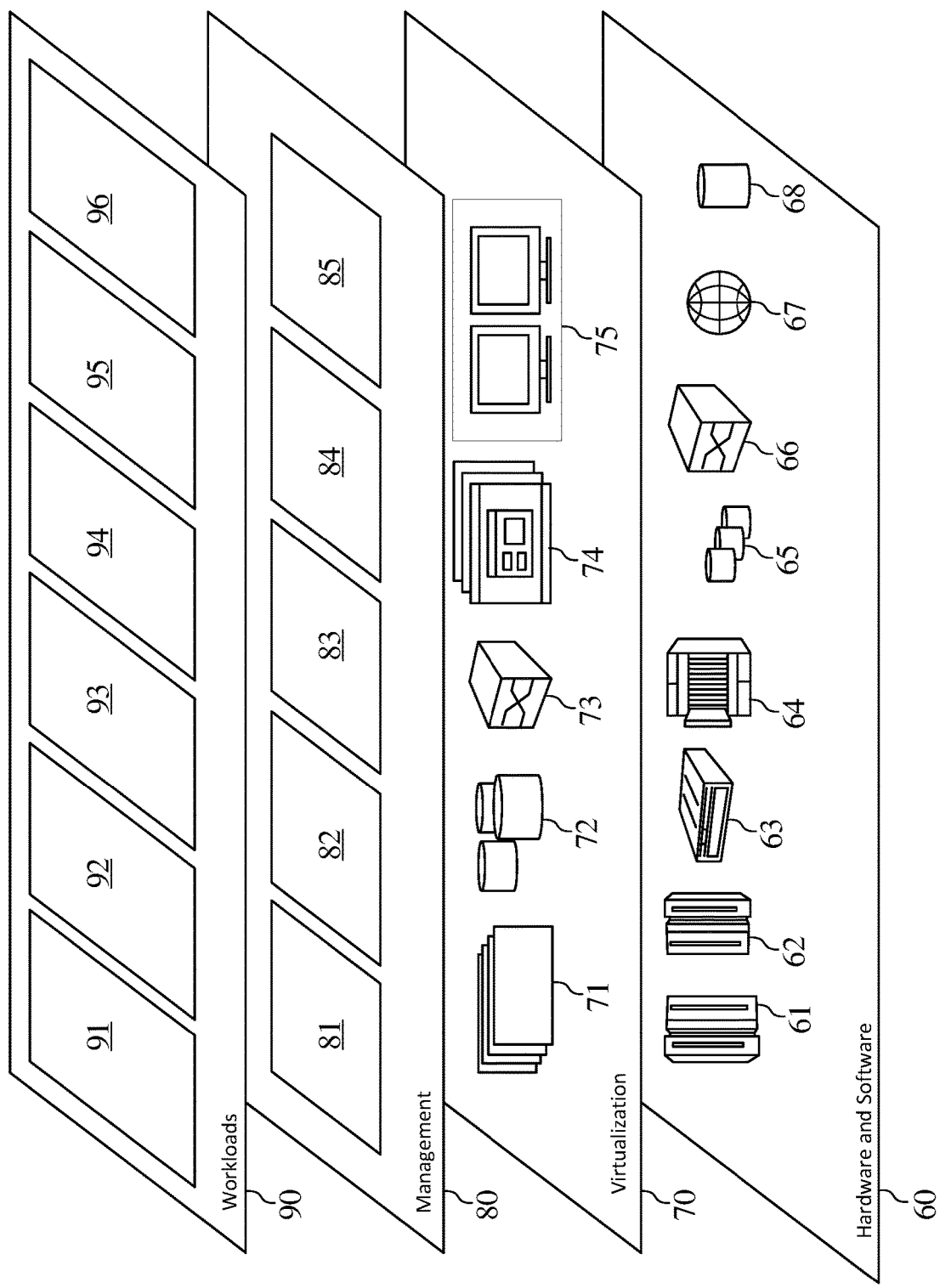
FIG. 9 depicts abstraction model layers according to various embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive neural networks 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
receiving a first search configuration for a search service,
wherein the first search configuration includes a first acceptance rate value and first search parameters for controlling a first search,
wherein the first acceptance rate value is below a threshold;
receiving a search log comprising a set of historical search configurations,
wherein one or more of the historical search configurations in the set of historical search configurations comprises a set of historical search parameters and a historical acceptance rate value;
analyzing the search log for historical search configurations with a high acceptance rate value,
wherein the acceptance rate value is a percentage of suggested terms that have been accepted by a user;
selecting one or more historical search configurations that exceed a threshold, based on the analyzing;
comparing the first search parameters to the set of historical search parameters;
electing, based on the comparing, one or more historical search configurations from the set of historical search configurations that are compatible with the first search configuration;
identifying, based on the selecting and the electing, a historical search configuration that exceeds the threshold based on the analyzing and is compatible with the first search configuration;
replacing a variable parameter in the first search parameters with a respective parameter from a model log search configuration resulting in a second search configuration; and
performing a search with the second search configuration.

2. The method according to claim 1, wherein a model historical acceptance rate value, included in the model historical search configuration, is an average acceptance rate value for multiple searches performed using model log search configuration.

3. The method according to claim 1, wherein the variable parameter is dynamically determined.

4. The method according to claim 1, further comprising identifying the variable parameter based on a probability that changing the variable parameter would cause the second search configuration to have a second acceptance rate that is higher than the first acceptance rate.

5. The method according to claim 1, wherein the search service operates on a document body of a content management system accessed by multiple tenants.

6. The method according to claim 5, wherein the first search configuration is tenant specific.

7. The method according to claim 1, wherein first search configuration includes at least one of the functions of the group comprising spellchecking, type-ahead, and autocomplete.

8. The method according to claim 1, wherein the search service is using an open source enterprise search platform.

9. The method according to claim 1, wherein the selecting is determined by a percentage of identical terms shared between the first search parameters and the set of historical search parameters.

10. A system comprising:
a processor; and
a memory in communication with the processor, the memory containing program instructions that, when executed by the processor, are configured to cause the processor to perform a method, the method comprising:
receiving a first search configuration for a search service,
wherein the first search configuration includes a first acceptance rate value and first search parameters for controlling a first search,
wherein the first acceptance rate value is below a threshold;
receiving a search log comprising a set of historical search configurations,
wherein one or more of the historical search configurations in the set of historical search configurations comprises a set of historical search parameters and a historical acceptance rate value;
analyzing the search log for historical search configurations with a high acceptance rate value,
wherein the acceptance rate value is a percentage of suggested terms that have been accepted by a user;
selecting one or more historical search configurations that exceed a threshold, based on the analyzing;
comparing the first search parameters to the set of historical search parameters;
electing, based on the comparing, one or more historical search configurations from the set of historical search configurations that are compatible with the first search configuration;
identifying, based on the selecting and the electing, a historical search configuration that exceeds the threshold based on the analyzing and is compatible with the first search configuration;
replacing a variable parameter in the first search parameters with a respective parameter from a model log search configuration resulting in a second search configuration; and
performing a search with the second search configuration.

11. The system of claim 10, wherein a model historical acceptance rate value, included in the model historical search configuration, is an average acceptance rate value for multiple searches performed using model log search configuration.

12. The system of claim 10, wherein the variable parameter is dynamically determined.

13. The system of claim 10, further comprising identifying the variable parameter based on a probability that changing the variable parameter would cause the second search configuration to have a second acceptance rate that is higher than the first acceptance rate.

14. The system of claim 10, wherein the search service operates on a document body of a content management system accessed by multiple tenants.

15. The system of claim 14, wherein the first search configuration is tenant specific.

16. The system of claim 10, wherein first search configuration includes at least one of the functions of the group comprising spellchecking, type-ahead, and autocomplete.

17. The system of claim 10, wherein the search service is using an open source enterprise search platform.

18. The system of claim 10, wherein the selecting is determined by a percentage of identical terms shared between the first search parameters and the set of historical search parameters.

19. A computer program product, the computer program product comprising a computer readable storage medium having program instructions embodied therewith, the program instructions executable by a computer to cause the computer to:

receive a first search configuration for a search service,
wherein the first search configuration includes a first acceptance rate value and first search parameters for controlling a first search,
wherein the first acceptance rate value is below a threshold;
receive a search log comprising a set of historical search configurations,
wherein one or more of the historical search configurations in the set of historical search configurations comprises a set of historical search parameters and a historical acceptance rate value;
analyze the search log for historical search configurations with a high acceptance rate value,
wherein the acceptance rate value is a percentage of suggested terms that have been accepted by a user;
select one or more historical search configurations that exceed a threshold, based on the analyzing;
compare the first search parameters to the set of historical search parameters;
elect, based on the comparing, one or more historical search configurations from the set of historical search configurations that are compatible with the first search configuration;
identify, based on the selecting and the electing, a historical search configuration that exceeds the threshold based on the analyzing and is compatible with the first search configuration;
replace a variable parameter in the first search parameters with a respective parameter from a model log search configuration resulting in a second search configuration; and
perform a search with the second search configuration.

20. The computer program product of claim 19, wherein a model historical acceptance rate value, included in the model historical search configuration, is an average acceptance rate value for multiple searches performed using model log search configuration.

* * * * *